United States Patent
Willmore et al.

(10) Patent No.: US 10,296,581 B2
(45) Date of Patent: May 21, 2019

(54) MULTI-WORD AUTOCORRECTION

(75) Inventors: Christopher P. Willmore, Santa Clara, CA (US); Nicholas K. Jong, Campbell, CA (US); Stephen W. Swales, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1656 days.

(21) Appl. No.: 13/604,439

(22) Filed: Sep. 5, 2012

(65) Prior Publication Data

US 2013/0332822 A1    Dec. 12, 2013

Related U.S. Application Data

(60) Provisional application No. 61/656,422, filed on Jun. 6, 2012.

(51) Int. Cl.
*G06F 17/27*    (2006.01)

(52) U.S. Cl.
CPC ........ *G06F 17/273* (2013.01); *G06F 17/2775* (2013.01)

(58) Field of Classification Search
CPC .................................................. G06F 17/273
USPC ....................................................... 715/257
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 5,940,847 A | 8/1999 | Fein et al. |
| 6,188,391 B1 | 2/2001 | Seely et al. |

(Continued)

FOREIGN PATENT DOCUMENTS

| | | |
|---|---|---|
| EP | 2 592 569 A2 | 5/2013 |
| JP | 2000-163031 A | 6/2000 |

(Continued)

OTHER PUBLICATIONS

Lee, S.K. et al. (Apr. 1985). "A Multi-Touch Three Dimensional Touch-Sensitive Tablet," Proceedings of *CHI: ACM Conference on Human Factors in Computing Systems*, pp. 21-25.

(Continued)

*Primary Examiner* — Shawn S Joseph
(74) *Attorney, Agent, or Firm* — Morrison & Foerster LLP

(57) ABSTRACT

Methods and systems of multi-word automatic correction ("autocorrect") are provided. Autocorrect generally can select a corrected word based on a typed word and a dictionary of correctly-spelled words. Multi-word autocorrect can add to this functionality by revisiting the selection of an initial corrected word if a subsequently-typed word indicates that it would be more appropriate to instead select an additional corrected word. In some cases, an autocorrect system can make a multi-word correction based on a multi-word phrase in a dictionary, such as replacing "new york" with "New York" as described above. In other cases, an autocorrect system can make a multi-word correction to correct a mistakenly-typed delimiter character. In other cases, an autocorrect system can use grammar rules to obtain additional context information with each subsequently-typed word and make multi-word corrections on that basis.

5 Claims, 3 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,957,955 B2 | 6/2011 | Christie et al. |
| 8,479,122 B2 | 7/2013 | Hotelling et al. |
| 2006/0026521 A1 | 2/2006 | Hotelling et al. |
| 2006/0197753 A1 | 9/2006 | Hotelling |
| 2009/0174667 A1 | 7/2009 | Kocienda et al. |
| 2013/0314352 A1* | 11/2013 | Zhai et al. .................... 345/173 |

FOREIGN PATENT DOCUMENTS

| | | |
|---|---|---|
| JP | 2002-342033 A | 11/2002 |
| WO | WO-00 70505 A1 | 11/2000 |
| WO | WO-2013/184599 A1 | 12/2013 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Anonymous. (Jun. 27, 2007). "iPhone Keyboard Secrets," New York Times, Retrieved from the Internet: URL:http:/fpogue.blogs.nytimes.com/2007/06/27/iphone-keyboard-secrets/?_r=0, retrieved on Sep. 10, 2013, 5 pages.

International Search Report dated Sep. 17, 2013, for PCT Application No. PCT/US2013/043947, filed Jun. 3, 2013, 5 pages.

* cited by examiner

MULTI-WORD AUTOCORRECTION

CROSS-REFERENCE TO RELATED APPLICATIONS

This application claims the benefit, under 37 U.S.C. § 119(e), of U.S. Provisional Patent Application Ser. No. 61/656,422, filed Jun. 6, 2012, the contents of which is herein incorporated by reference in its entirety for all purposes.

FIELD OF THE DISCLOSURE

This relates generally to the automatic correction of words input on a touch-sensitive device.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device.

When text is input via a touchscreen keyboard, it can be helpful to automatically correct mistakes made by a user. Such functionality is commonly known as autocorrect. An autocorrect system can determine a word that a user intended to type based on characters input by a user and a dictionary of correctly-spelled words. After determining the word the user intended to type, the system can replace the input characters with the word the user intended to type. However, such a system may yield poor results, particularly in a case where additional information such as the context of the word can help to better predict the word the user intended to type.

SUMMARY OF THE DISCLOSURE

This relates to multi-word automatic correction ("autocorrect") methods and systems. Autocorrect generally can select a corrected word based on a typed word and a dictionary of correctly-spelled words. Multi-word autocorrect can add to this functionality by revisiting the selection of an initial corrected word if a subsequently-typed word indicates that it would be more appropriate to instead select an additional corrected word. For example, an autocorrect system with multi-word functionality might select an initial corrected word "new" based on a user's input of the characters "n", "e", and "s". However, if the subsequently-typed word is "york", then the autocorrect system can revisit the selection of "new" and instead select an additional corrected word "New". Additionally, the autocorrect system can select a corrected word "York" to replace the typed word "york".

In some cases, an autocorrect system can make a multi-word correction based on a multi-word phrase in a dictionary, such as replacing "new york" with "New York" as described above. In other cases, an autocorrect system can make a multi-word correction to correct a mistakenly-typed delimiter character. For example, if a space character is typed instead of an "n" character in the word "technology", then the autocorrect system can replace "tech ology" with "technology". In other cases, an autocorrect system can use grammar rules to obtain additional context information with each subsequently-typed word and make multi-word corrections on that basis. For example, an autocorrect system might accept as correct the word "vert". However, if the next-typed word is "good", then system might recognize that an adverb ("very") may be more likely than a noun ("vert") to precede an adjective ("good"). The system can then replace "vert good" with "very good".

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

Various embodiments relate to multi-word automatic correction ("autocorrect") methods and systems. Autocorrect generally can select a corrected word based on a typed word and a dictionary of correctly-spelled words. Multi-word autocorrect can add to this functionality by revisiting the selection of an initial corrected word if a subsequently-typed word indicates that it would be more appropriate to instead select an additional corrected word. For example, an autocorrect system with multi-word functionality might select an initial corrected word "new" based on a user's input of the characters "n", "e", and "s". However, if the subsequently-typed word is "york", then the autocorrect system can revisit the selection of "new" and instead select an additional corrected word "New". Additionally, the autocorrect system can select a corrected word "York" to replace the typed word "york".

In some cases, an autocorrect system can make a multi-word correction based on a multi-word phrase in a dictionary, such as replacing "new york" with "New York" as described above. In other cases, an autocorrect system can make a multi-word correction to correct a mistakenly-typed delimiter character. For example, if a space character is typed instead of an "n" character in the word "technology", then the autocorrect system can replace "tech ology" with "technology". In other cases, an autocorrect system can use grammar rules to obtain additional context information with each subsequently-typed word and make multi-word corrections on that basis. For example, an autocorrect system might accept as correct the word "vert". However, if the next-typed word is "good", then system might recognize that an adverb ("very") may be more likely than a noun ("vert")

to precede an adjective ("good"). The system can then replace "vert good" with "very good".

Although embodiments disclosed herein may be described and illustrated herein primarily in terms of a touch-sensitive keyboard displayed on a touch screen, it should be understood that the embodiments are not so limited, but are additionally applicable to touch-sensitive keyboards in general, or any type of keyboard and display system.

Figure 1:
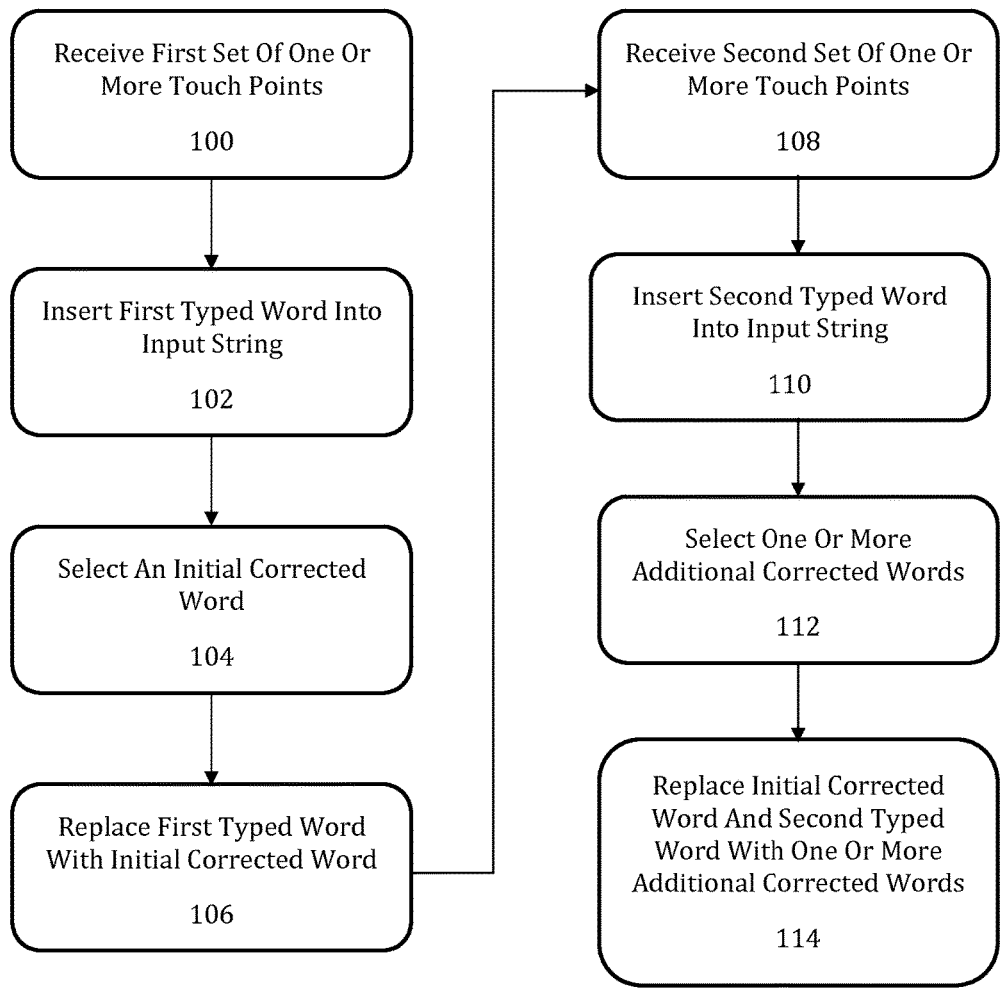
FIG. 1 illustrates an exemplary multi-word autocorrect method according to embodiments of the disclosure.

FIG. 1 illustrates an exemplary multi-word autocorrect method according to embodiments of the disclosure. First, at step 100, a first set of one or more touch points can be received on a touch-sensitive keyboard. The touch-sensitive keyboard can be a part of a touch-sensitive surface such as a touchpad. The touch-sensitive keyboard can be part of a touch-sensitive surface coupled to or integrated with a display to form a touchscreen. The touch-sensitive keyboard itself can be displayed on the touchscreen.

Next, at step 102, a first typed word can be inserted into an input string. This can include, for each touch point of the first set, inserting a corresponding typed character of the touch-sensitive keyboard into the input string. Location data of each touch point can be used to determine a corresponding key on the touch-sensitive keyboard. Additionally, each key can have a corresponding character. Characters can include numbers, letters, symbols, control functions, and the like. Additionally characters can include delimiter characters such as a space character and a return character. For example, if location data of a touch point indicates that the touch point was located over the "a" character on the touch-sensitive keyboard, then an "a" character can be inserted into the input string.

The determination of a key and character corresponding to a touch point can be based on location data of the touch point and a probability distribution over keys of the touch-sensitive keyboard proximate to the location of the touch point. For example, if location data of a touch point indicates that the touch point is proximate to the "j", "k", and "m" keys on the touch-sensitive keyboard, then the determination of the corresponding key and character can be based on a probability distribution over the "j", "k", and "m" keys. The probabilities can be based on distance to each key, usage frequency of each key, a previously-typed letter, and/or other factors. For example, the probability for "m" might be relatively high because the touch point is very close to the center of the "m" key, whereas the probability for "j" might be relatively low because the "j" key might be rarely typed. Alternatively, the determination of a corresponding key and character may be based only on a distance of a touch point to surrounding keys.

An input string can be a data structure storing an array of characters input by a user. Various operations can be performed on an input string including, without limitation, insertion, deletion, and replacement of one or more characters. A user can add characters to an input string by typing on the touch-sensitive keyboard. As the user types, a multi-word autocorrect method can replace one or more characters in the input string. The input string can serve as input for applications on a device coupled to the touch-sensitive keyboard. Such applications can include messaging applications, word processing applications, email applications, and music applications, among others. In one example, the input string may start empty, and in another example, the input string may already contain characters. Characters can be inserted at any position of the input string in addition to the end of the input string.

In one example, three touch points can be received on a touch-sensitive keyboard. The first touch point corresponds to the "n" key, and the character "n" can be inserted into an input string. The second touch point corresponds to the "e" key, and the character "e" can be inserted into the input string after the "n". Finally, the third touch point corresponds to the "w" key, and the character "w" can be inserted into the input string after the "e". In this way, the typed word "new" can be inserted into the input string.

Next, at step 104, an initial corrected word can be selected. A set of one or more candidate corrected words can be created. Each candidate corrected word can be assigned a score. In one example, the candidate corrected word with the highest score can be selected as the initial corrected word. The selection of the initial corrected word may occur in response to receiving a touch point on the touch-sensitive keyboard corresponding to a delimiter character, such as a space character or a return character. In another example, a subset of the set of candidate corrected words can be presented to a user, and the user can cause one of the subset to be selected as the initial corrected word. The subset of candidate corrected words may in some cases consist of the entire set of candidate corrected words. Additionally, the subset of candidate corrected words may contain the word exactly as typed by a user.

A candidate corrected word may contain multiple words, each separated by a delimiter character, such as a space character. For example, "Salt Lake City" may be a candidate corrected word.

A set of candidate corrected words can be created from a dictionary of words. A dictionary can be a simple list of words. However, in some cases a dictionary can be dynamic, changing based on various factors. A dynamic dictionary can have different words depending on application context. For example, a dictionary may contain abbreviations such as "lol" and "btw" for messaging applications. A dynamic dictionary may also contain words imported from other applications. For example, a dynamic dictionary may contain names, phone numbers, or addresses imported from a contacts application. Additionally, a dynamic dictionary may combine individual words to form multi-word candidate words. For example, a dictionary containing both the words "of" and "the" might combine the two to form the candidate corrected word "of the". Such combinations may be made based on grammar rules. For example, based on a rule that a preposition sometimes precedes an article but a preposition never follows an article, the candidate corrected word "of the" may be constructed, but the candidate corrected word "the of" would not be constructed.

A candidate corrected word can be assigned a score based on a comparison between the candidate corrected word and a typed word. The two words can be compared on a character-by-character basis to determine similarity. A candidate corrected word can be assigned a high score if it is determined to be similar to the typed word and a low score if it is determined to not be similar to the typed word. Alternately, similarity can be determined by calculating an edit distance (such as a Levenshtein distance) between a candidate corrected word and a typed word. In such a case, a candidate corrected word with a low edit distance from a typed word can be assigned a high score, and a candidate corrected word with a high edit distance from a typed word can be assigned a low score.

A candidate corrected word can be assigned a score based on a comparison between touch points as received by the touch-sensitive keyboard and a directed graph associated with the candidate corrected word. Graph-matching techniques can be used to quantify the similarity between the sequence of touch points and the directed graph, and the score can be based on such a value.

Additionally, a candidate corrected word can be assigned a score based on a usage frequency value of the candidate corrected word. The usage frequency value may be predetermined based on the usage of the word in a messaging system, for example, or in literature. In some cases, different usage frequency values can be used for different applications. For example, a value reflecting usage of a word in a messaging application can be used in an autocorrect method of a messaging application, whereas a value reflecting usage of a word in a word processing application can be used in an autocorrect method of a word processing application.

A score may be based on preceding and/or succeeding words in an input string. For example, "of the" can be more frequent in common usage than "of then". Accordingly, if the preceding word in the input string is "of", then a candidate corrected word "the" can be assigned a higher usage frequency value and score than a candidate corrected word "then".

A score can be assigned based on grammar rules. For example, a candidate corrected word may be assigned a high score if the word's part of speech is appropriate given the preceding and/or succeeding words in an input string. An adverb ("very") may be more likely than a noun ("vert") to precede an adjective ("good"), in one example. Accordingly, if the succeeding word in the input string is "good", then a candidate corrected word "very" can be assigned a higher score than a candidate corrected word "vert".

A score can be based on a function of any or all of the above metrics. For example, a score can be assigned based on a multiplication of a usage frequency value of a candidate corrected word and a similarity value calculated using an edit distance between the candidate corrected word and a typed word. Other functions of any or all of the above metrics can be used to calculate a score.

Next, at step 106, the first typed word can be replaced in the input string with the initial corrected word as selected at step 104. The replacement can be accomplished by a replacement operation on the input string. Alternately, each character of the first typed word can be deleted from the input string and each character of the initial corrected word can be inserted into the input string. In one example, a delimiter character such as a space character may be inserted into the input string at the end of the initial corrected word. Additionally, replacing the first typed word in the input string with the initial corrected word can consist of determining that the first typed word is the same as the initial corrected word.

A correspondence between the first set of touch points and the characters in the input string can be maintained. If the decision to select the initial corrected word is later revisited, the multi-word autocorrect method may need to again take into account the first set of touch points. In such a case, it can be important to store information regarding a correspondence between the first set of touch points and the characters in the input string. Storing information regarding a correspondence between a touch point and a character in an input string can include storing a reference to the touch point and associating the reference with the character. It can include storing a reference to the character and associating the reference with the touch point. However, maintaining the correspondence may be accomplished in alternate ways.

In one example, if a user intends to type the keys for "technology" but instead types the keys for "techn logy", two sets of touch points are received: a first set of five touch points corresponding to the characters "techn" and a second set of four touch points corresponding to the characters "logy" (a touch point corresponding to a delimiter character is received between the two sets). After the first set is received and the word "techn" is inserted into the input string, the word "techno" may be selected to replace the word "techn" in the input string. Here, a correspondence can be maintained between each of the first set of five touch points and the characters "t", "e", "c", "h", and "n" of the word "techno" in the input string, respectively. Later, when the word "techno" is revisited for possible replacement in the context of the succeeding word "logy", the correct set of touch points, the first set, can be retrieved for use in selecting candidate correction words.

Next, at step 108, a second set of one or more touch points can be received on the touch-sensitive keyboard. The second set of touch points can be received in a manner similar to the receipt of the first set of one or more touch points at step 100.

Next, at step 110, a second typed word can be inserted into an input string, including, for each touch point of the second set, inserting a corresponding typed character of the touch-sensitive keyboard into the input string. The second word can be inserted in a manner similar to the insertion of the first word at step 102. In one example, the second word can be inserted into the input string immediately following a delimiter character that follows the first word in the input string.

Next, at step 112, one or more additional corrected words can be selected. The one or more additional corrected words can be selected in a manner similar to the selection of the initial corrected word at step 104. However, the one or more additional corrected words can be selected based on any or all of the initial corrected word, the second typed word, the first set of touch points, and the second set of touch points, among other things. In one example, a maintained correspondence between the characters of the initial corrected word and the first set of touch points can be used to retrieve the first set of touch points.

Two additional corrected words can be selected: a first additional corrected word for the first set of touch points and a second additional corrected word for the second set of touch points. In this case, each additional corrected word can be selected in a manner similar to the selection of the initial corrected word at step 104. For example, the first additional corrected word can be selected based on the first set of touch points with the additional context of the second set of touch points. In this way, using the same method but with additional information, a first additional corrected word can be selected that differs from the initial corrected word. Additionally, the second additional corrected word can be selected based on the second set of touch points with the additional context of the first set of touch points. In one example, the first additional corrected word may be the same as the initial corrected word.

In one example, a user can type a first set of touch points corresponding to "neq" on a touch-sensitive keyboard, followed by a delimiter character. The autocorrect method can select the word "new" as an initial corrected word based on the first set of touch points and replace "neq" with "new" in an input string. A correspondence between the characters "new" in the input string and the first set of touch points can be maintained. Then, the user can type a second set of touch points corresponding to "york" on the touch-sensitive keyboard. The autocorrect method can select one or more additional corrected words to replace "new" and "york". First, the first set of touch points corresponding to "new" can be obtained. Then, the first additional corrected word "New" can be selected based on the first set of touch points and the second set of touch points. Finally, the second additional corrected word "York" can be selected based on the second set of touch points. The selection of the second additional corrected word may also be based on the first set of touch points.

A single additional corrected word can be selected based on both the first set of touch points and the second set of touch points. The additional corrected word can also be based, on a touch point corresponding to a delimiter character received between the first and second sets of touch points. For example, a combined set of touch points can be obtained comprising a first set of touch points, a touch point corresponding to a delimiter character, and a second set of touch points. The additional corrected word can then be selected based on the combined set of touch points.

In one example, a combined set of touch points corresponding to "techn logy" can comprise a first set corresponding to "techn", a touch point corresponding to a space character, and a second set corresponding to "logy". Based on the combined set corresponding to "techn logy", the additional corrected word "technology" can be selected. The additional corrected word can comprise multiple words. Accordingly, in another example, a combined set of touch points corresponding to "new york" can comprise a first set corresponding to "new", a touch point corresponding to a space character, and a second set corresponding to "york". Based on the combined set corresponding to "new york", the additional corrected word "New York" can be selected.

Next, at step 114, the initial corrected word and the second typed word can be replaced in the input string with the one or more additional corrected words. In the case of one additional corrected word, the initial corrected word, the second typed word, and the delimiter character between the two can be replaced with the additional corrected word. In the case of two additional corrected words, the initial corrected word can be replaced with the first additional corrected word and the second typed word can be replaced with the second additional corrected word. The initial corrected word, the second typed word, and the delimiter character between the two can be replaced with two or more additional corrected words, each word followed by a delimiter character.

Additionally, a correspondence can be maintained between the second set of touch points and the characters in the input string so that the replacement of the second typed word with a second additional corrected word may be revisited later.

In one example, the first set of touch points may be discarded after the replacement of the initial corrected word with a first additional corrected word. However, the correspondence between the first set of touch points on the characters in the input string can be updated based on the replacement of the initial corrected word with the first additional corrected word. This can allow for autocorrect methods that handle more than two words at a time. For example, suppose a first set of touch points corresponding to "nes" is corrected to "new". A correspondence between the first set of touch points and "new" in an input string can be maintained. Then, after the user types "york", the input string can be corrected from "new york" to "New York". A correspondence between the first set of touch points and "New" in the input string can be maintained. Finally, after the user types "iii", the input string can be corrected from "New York iii" to "Ned York III" (if, for example, the dictionary contains "Ned York III" or the system recognizes that a name and not a city is likely to precede the word "iii"). Because a correspondence has been maintained after each correction, the first set of touch points can continue to be used to make further corrections after receiving additional touch points.

The set of touch points to be discarded may be different from the first set of touch points. For example, suppose the first and second sets of touch points together result in the input string "thentea her". The input string can be corrected to "the teacher". At this point, the touches corresponding to the characters "the" and the delimiting space (but not the first set of touch points, corresponding to "thentea") may be discarded. The correspondence maintained between the touch points and the individual characters in the input string can allow the system to determine which touches correspond to the word "the", and therefore which touches may be discarded.

Figure 2:
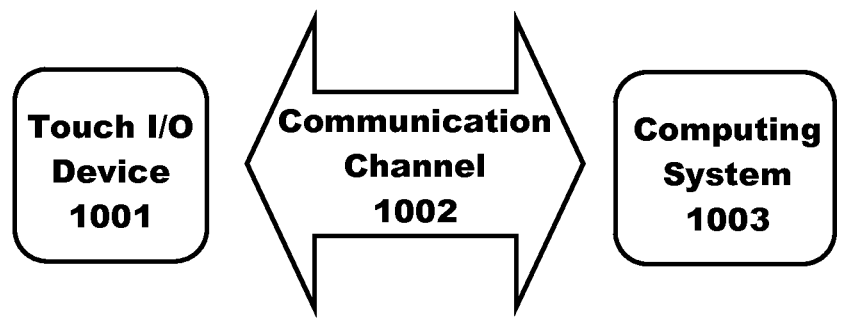
FIG. 2 illustrates a block diagram of an exemplary touch/IO device that can receive touch input for interacting with a computing system according to embodiments of the disclosure.
Figure 3:
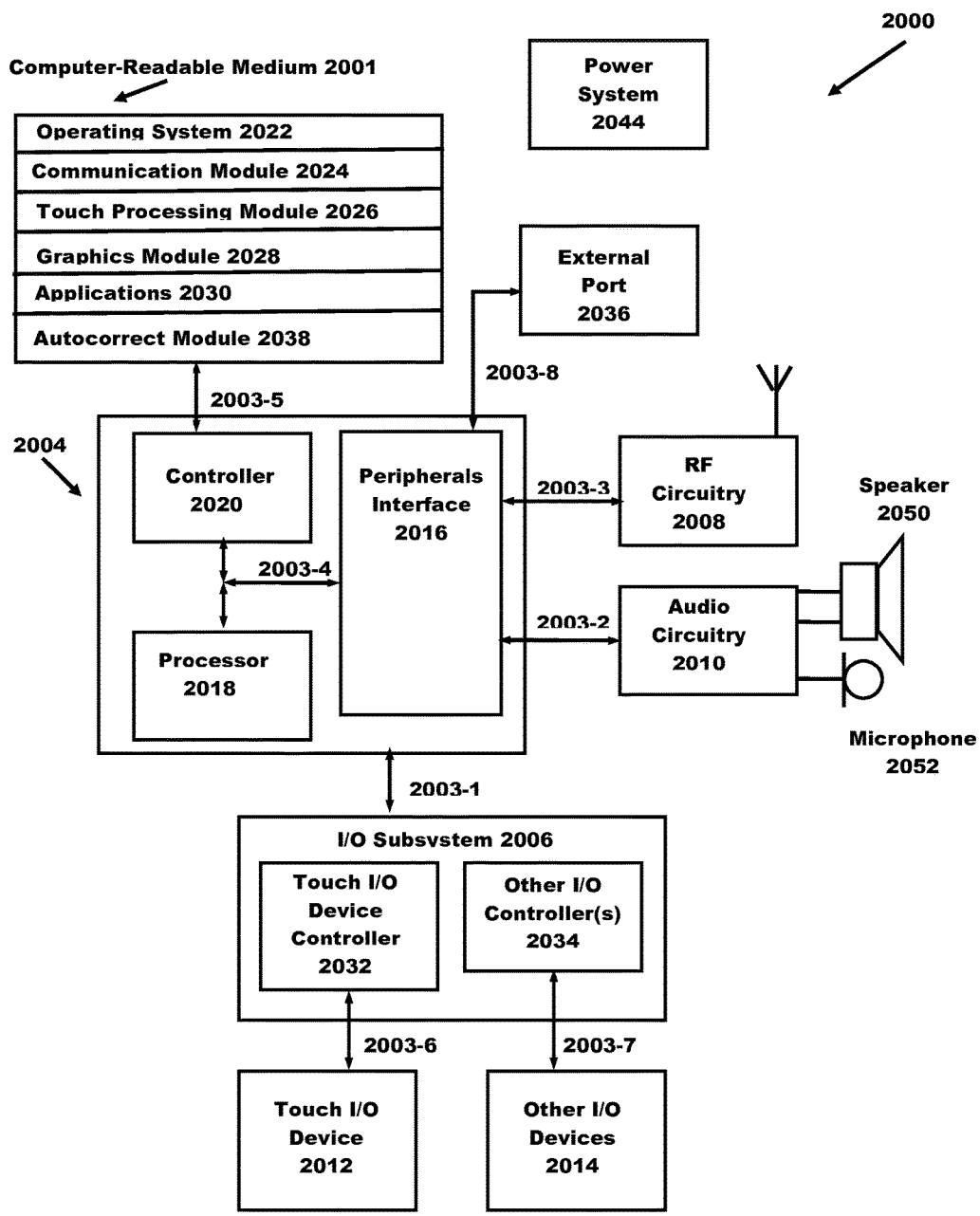
FIG. 3 illustrates a block diagram illustrating an exemplary device according to embodiments of the disclosure.

FIG. 3 illustrates a block diagram of an exemplary touch/IO device that can receive touch input for interacting with a computing system according to embodiments of the disclosure. Described embodiments may include touch I/O device 1001 that can receive touch input for interacting with computing system 1003 (FIG. 2) via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch-sensitive keyboard, touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. In one example, touch I/O device 1001 functions to display graphical data transmitted from computing system 1003 (and/or another source) and also functions to receive user input. In another example, touch I/O device 1001 may be embodied as an integrated touch screen where touch sensitive components/devices are integral with display components/devices. In another example, a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. The user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In one example in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Attention is now directed towards a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 3 is a block diagram a system 2000 that generally includes one or more computer-readable media 2001, processing system 2004, Input/Output (I/O) subsystem 2006, radio frequency (RF) circuitry 2008 and audio circuitry 2010. These components may be coupled by one or more communication buses or signal lines 2003.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. Audio circuitry 2010 can include a headphone jack (not shown).

Peripherals interface 2016 couples the input and output peripherals of the system to processor 2018 and non-transitory computer-readable storage medium 2001. One or more processors 2018 communicate with one or more computer-readable mediums 2001 via controller 2020. Non-transitory computer-readable storage medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. The software components can include operating system 2022, communication module (or set of instructions) 2024, touch processing module (or set of instructions) 2026, graphics module (or set of instructions) 2028, one or more applications (or set of instructions) 2030, and autocorrect module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. Medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In one example in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include autocorrect module 2038 for performing the method/functions as described herein in connection with FIG. 1. Autocorrect module 2038 may at least function to automatically correct text typed on a touch-sensitive keyboard associated with touch I/O device 2012. Module 2038 may also interact with I/O subsystem 2006 and touch processing module 2026 to obtain touch points received on the touch-sensitive keyboard, and with any of applications 2030 to automatically correct text in one or more input strings associated with any of applications 2030. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. One such user-interface object may be a touch-sensitive keyboard. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety for all purposes.

In one example in which touch I/O device 2012 is a touch screen, the touch screen may use LCD (liquid crystal display) technology, LPD (light emitting polymer display) technology, OLED (organic LED), or OEL (organic electro luminescence), although other display technologies may be used.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In one example, peripherals interface 2016, one or more processors 2018, and memory controller 2020 may be implemented on a single chip, such as processing system 2004. In another example, they may be implemented on separate chips.

In some examples, a computer-implemented method is disclosed. The method can include receiving a first set of one or more touch points on a touch-sensitive keyboard; inserting a first typed word into an input string, including, for each touch point of the first set, inserting a corresponding typed character of the touch-sensitive keyboard into the input string; selecting an initial corrected word; replacing the first typed word in the input string with the initial corrected word; receiving a second set of one or more touch points on the touch-sensitive keyboard; inserting a second typed word into the input string, including, for each touch point of the second set, inserting a corresponding typed character of the touch-sensitive keyboard into the input string; selecting one or more additional corrected words; and replacing the initial corrected word and the second typed word in the input string with the one or more additional corrected words. Additionally or alternatively to one or more of the examples disclosed above, a typed character corresponding to each touch point of the first set can be determined based on location data of that touch point. Additionally or alternatively to one or more of the examples disclosed above, a typed character corresponding to each touch point of the first set can be determined based on a probability distribution over keys of the touch-sensitive keyboard proximate to a location of that touch point. Additionally or alternatively to one or more of the examples disclosed above, the method can further include: maintaining a correspondence between one or more characters of the input string and each of the first set of touch points; and retrieving the first set of touch points based on the maintained correspondence; wherein the selection of the one or more additional corrected words can be based on the first set of touch points. Additionally or alternatively to one or more of the examples disclosed above, the method can further include: creating a set of one or more candidate corrected words; and scoring each of the one or more candidate corrected words; wherein selecting the one or more additional corrected words can include selecting the one or more additional corrected words from the set of one or more candidate corrected words. Additionally or alternatively to one or more of the examples disclosed above, scoring each of the one or more candidate corrected words can be based on a grammar rule. Additionally or alternatively to one or more of the examples disclosed above, scoring each of the one or more candidate corrected words can be based on one or both of the first and second sets of touch points. Additionally or alternatively to one or more of the examples disclosed above, selecting the one or more additional corrected words can include selecting a first additional corrected word and a second additional corrected word. Additionally or alternatively to one or more of the examples disclosed above, the first additional corrected word can be selected based on both the first and second sets of touch points, and replacing the initial corrected word can include replacing the initial corrected word with the first additional corrected word. Additionally or alternatively to one or more of the examples disclosed above, selecting the one or more additional corrected words can consist of selecting an additional corrected word. Additionally or alternatively to one or more of the examples disclosed above, the additional corrected word can be selected based on both the first and second sets of touch points.

In some examples, a portable electronic device is disclosed. The device can include: one or more processors; a touch-sensitive panel; a memory; and one or more programs stored in the memory, wherein the one or more programs are configured to be executed by the one or more processors, the one or more programs including instructions for: receiving a first set of one or more touch points on a touch-sensitive keyboard of the touch-sensitive panel; inserting a first typed word into an input string, including, for each touch point of the first set, inserting a corresponding typed character of the touch-sensitive keyboard into the input string; selecting an initial corrected word; replacing the first typed word in the input string with the initial corrected word; receiving a second set of one or more touch points on the touch-sensitive keyboard; inserting a second typed word into the input string, including, for each touch point of the second set, inserting a corresponding typed character of the touch-sensitive keyboard into the input string; selecting one or more additional corrected words; and replacing the initial corrected word and the second typed word in the input string with the one or more additional corrected words. Additionally or alternatively to one or more of the examples disclosed above, the device can further include a display, wherein the one or more programs can further include instructions for displaying the touch-sensitive keyboard on the display. Additionally or alternatively to one or more of the examples disclosed above, the one or more programs can further include instructions for: maintaining a correspondence between one or more characters of the input string and each of the first set of touch points; and retrieving the first set of touch points based on the maintained correspondence; wherein the selection of the one or more additional corrected words can be based on the first set of touch points.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented method, comprising:
   receiving a first set of one or more touch points on a touch-sensitive keyboard;
   inserting a first typed word into an input string, including, for each touch point of the first set, inserting a corresponding typed character of the touch-sensitive keyboard into the input string;
   selecting an initial corrected word;
   replacing the first typed word in the input string with the initial corrected word;
   receiving a second set of one or more touch points on the touch-sensitive keyboard;
   inserting a second typed word into the input string, including, for each touch point of the second set, inserting a corresponding typed character of the touch-sensitive keyboard into the input string;
   selecting one or more additional corrected words;
   replacing the initial corrected word and the second typed word in the input string with the one or more additional corrected words;
   maintaining a correspondence between one or more characters of the input string and each of the first set of touch points; and
   retrieving the first set of touch points based on the maintained correspondence;
   wherein the selection of the one or more additional corrected words is based on the first set of touch points.

2. A computer-implemented method, comprising:
   receiving a first set of one or more touch points on a touch-sensitive keyboard;
   inserting a first typed word into an input string, including, for each touch point of the first set, inserting a corresponding typed character of the touch-sensitive keyboard in to the input string;
   selecting an initial corrected word;
   replacing the first typed word in the input string with the initial corrected word;
   receiving a second set of one or more touch points on the touch-sensitive keyboard;
   inserting a second typed word into the input string, including, for each touch point of the second set, inserting a corresponding typed character of the touch-sensitive keyboard into the input string; selecting one or more additional corrected words;
   replacing the initial corrected word and the second typed word in the input string with the one or more additional corrected words;
   wherein selecting the one or more additional corrected words consists of selecting an additional corrected word;
   wherein the additional corrected word is selected based on both the first and second sets of touch points.

3. A non-transitory computer readable storage medium having stored therein instructions, which when executed by a device with a touch-sensitive keyboard, cause the device to perform a method comprising:
- receiving a first set of one or more touch points on the touch-sensitive keyboard;
- inserting a first typed word into an input string, including, for each touch point of the first set, inserting a corresponding typed character of the touch-sensitive keyboard into the input string;
- selecting an initial corrected word;
- replacing the first typed word in the input string with the initial corrected word;
- receiving a second set of one or more touch points on the touch-sensitive keyboard;
- inserting a second typed word into the input string, including, for each touch point of the second set, inserting a corresponding typed character of the touch-sensitive keyboard into the input string;
- selecting one or more additional corrected words;
- replacing the initial corrected word and the second typed word in the input string with the one or more additional corrected words;
- maintaining a correspondence between one or more characters of the input string and each of the first set of touch points; and
- retrieving the first set of touch points based on the maintained correspondence;
- wherein the selection of the one or more additional corrected words is based on the first set of touch points.

4. A non-transitory computer readable storage medium having stored therein instructions, which when executed by a device with a touch -sensitive keyboard, cause the device to perform a method comprising:
- receiving a first set of one or more touch points on the touch-sensitive keyboard;
- inserting a first typed word into an input string, including, for each touch point of the first set, inserting a corresponding typed character of the touch-sensitive keyboard in to the input string;
- selecting an initial corrected word;
- replacing the first typed word in the input string with the initial corrected word;
- receiving a second set of one or more touch points on the touch-sensitive keyboard;
- inserting a second typed word into the input string, including, for each touch point of the second set, inserting a corresponding typed character of the touch-sensitive keyboard in to the input string;
- selecting one or more additional corrected words;
- replacing the initial corrected word and the second typed word in the input string with the one or more additional corrected words;
- wherein selecting the one or more additional corrected words consists of selecting an additional corrected word; and
- wherein the additional corrected word is selected based on both the first and second sets of touch points.

5. A portable electronic device, comprising:
- one or more processors;
- a touch-sensitive panel;
- a memory; and
- one or more programs stored in the memory, wherein the one or more programs are configured to be executed by the one or more processors, the one or more programs including instructions for:
- receiving a first set of one or more touch points on a touch-sensitive keyboard of the touch-sensitive panel;
- inserting a first typed word into an input string, including, for each touch point of the first set, inserting a corresponding typed character of the touch-sensitive keyboard in to the input string;
- selecting an initial corrected word;
- replacing the first typed word in the input string with the initial corrected word;
- receiving a second set of one or more touch points on the touch-sensitive keyboard;
- inserting a second typed word into the input string, including, for each touch point of the second set, inserting a corresponding typed character of the touch-sensitive keyboard into the input string;
- selecting one or more additional corrected words;
- replacing the initial corrected word and the second typed word in the input string with the one or more additional corrected words;
- maintaining a correspondence between one or more characters of the input string and each of the first set of touch points; and
- retrieving the first set of touch points based on the maintained correspondence;
- wherein the selection of the one or more additional corrected words is based on the first set of touch points.

* * * * *